United States Patent Office 3,251,488
Patented May 17, 1966

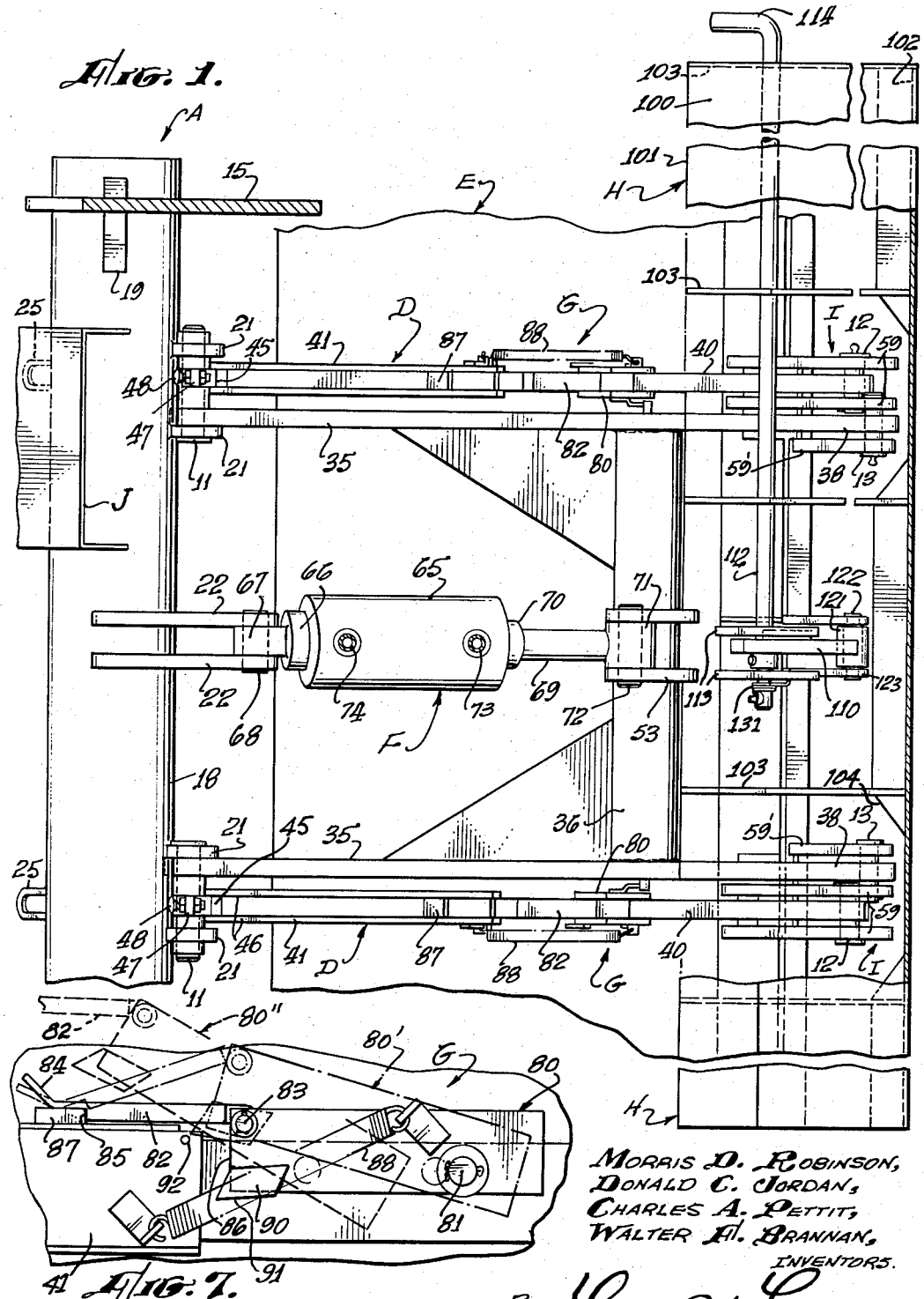

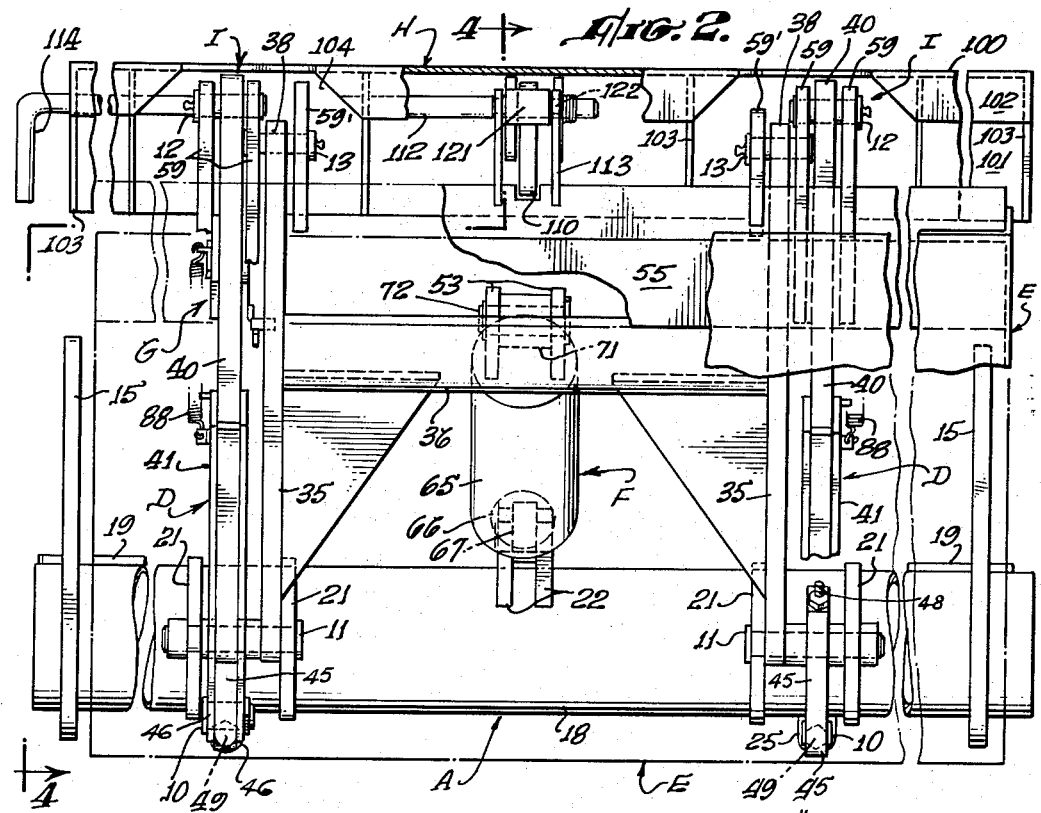
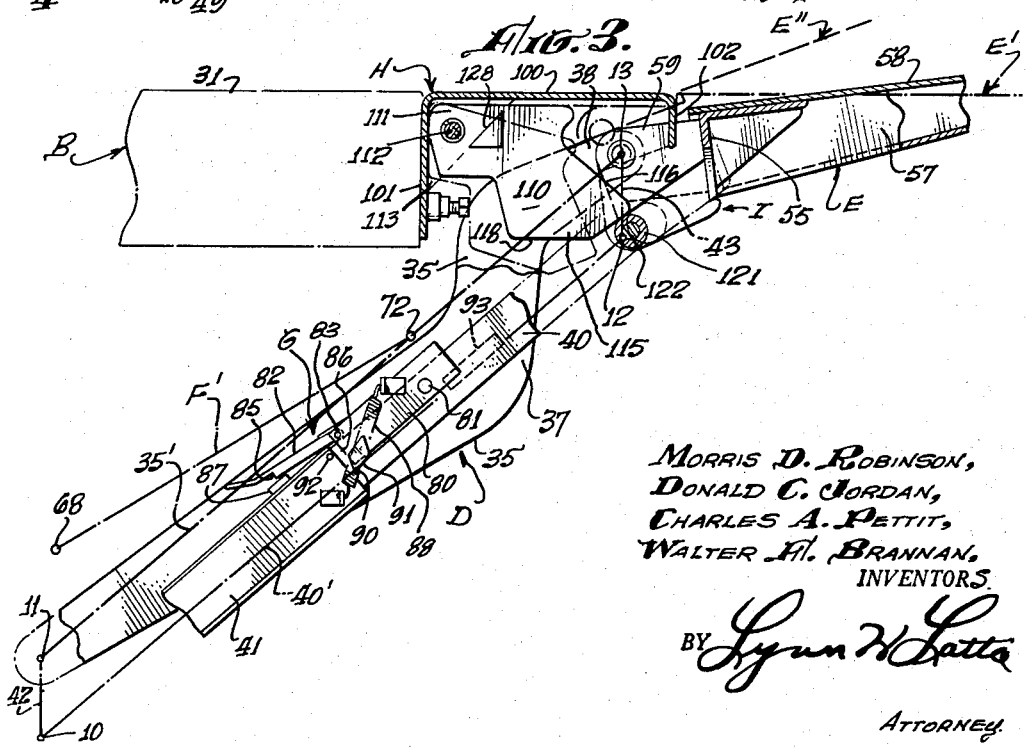

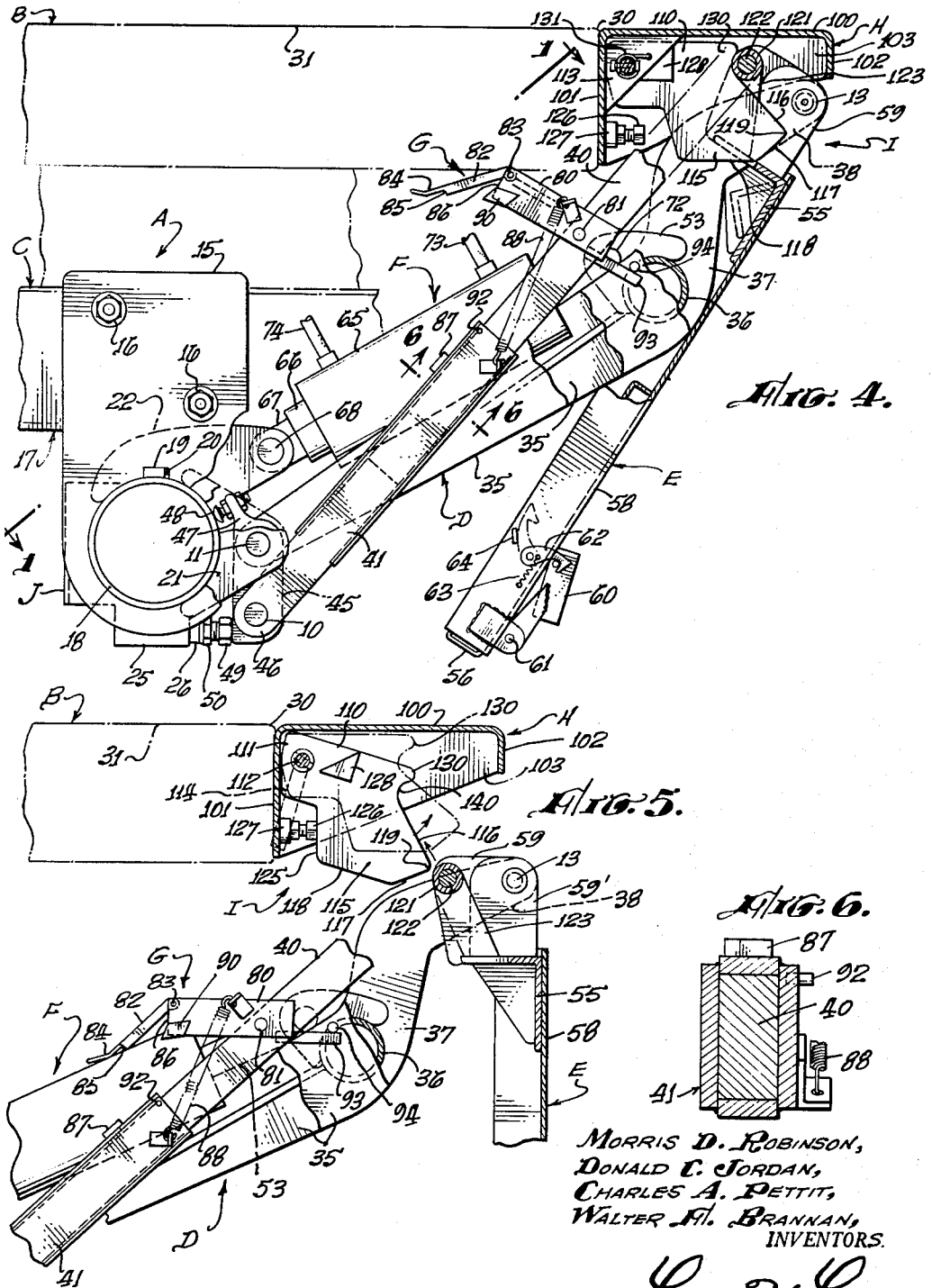

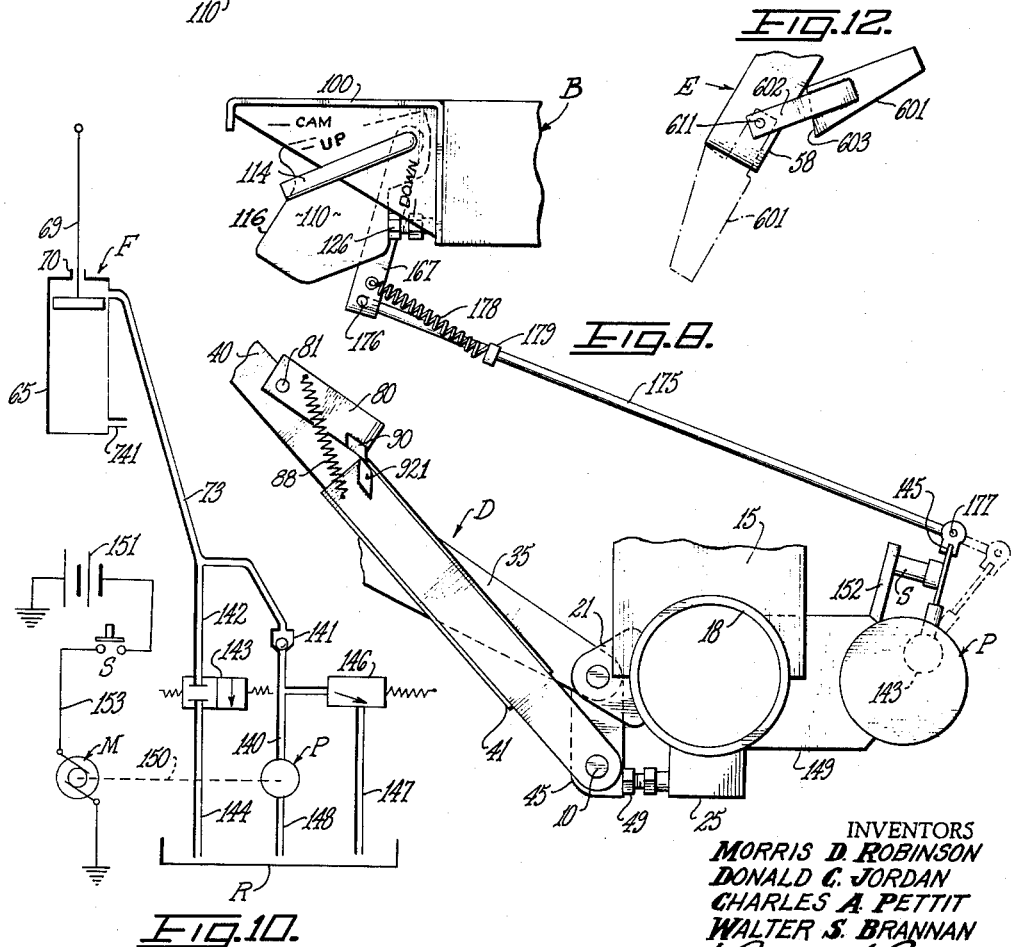

3,251,488
TAIL GATE LIFT WITH CAM CONTROLLED STOWING ACTION
Morris D. Robinson, 3721 W. 185th St., Torrance, Calif.;
Donald C. Jordan, 2602 W. 182nd St., Redondo Beach, Calif.; Charles A. Pettit, 20011 Bernist Ave., Torrance, Calif.; and Walter F. Brannan, 4135 Silverleaf Drive, Rolling Hills Estates, Calif.
Filed Feb. 19, 1965, Ser. No. 437,625
22 Claims. (Cl. 214—77)

This application is a continuation-in-part of my pending application Serial No. 243,490, filed December 10, 1962 for Tail Gate Lift With Cam Controlled Stowing Action, now abandoned.

This invention relates to power-operated lift apparatus for transport trucks, moving vans, other freight carrying vehicles, and for other applications such as loading docks. We designate the apparatus generally as a tail gate lift because of its positional and operational relationship to a truck bed, although it does not actually function as a tail gate. The general object of our invention is to provide an improved power-operated lift apparatus embodying in general a platform which is movable between a loading position adjacent and parallel to a ground surface (e.g. on which the truck wheels rest) and an elevated position in which its upper surface is substantially flush with that of the truck bed, whereby heavy articles of furniture, machinery and the like can be easily loaded from the ground surface onto the lift platform, thence elevated to the truck bed level, and thence easily shifted onto the truck bed. The invention is especially directed to mechanism for stowing the platform in an out-of-the-way position, clearing the ground surface and any obstructions normally passed over by the truck during transit, and disposed beneath the fixed truck bed surface.

A specific object of the invention is to provide a swinging arm carriage structure for supporting the platform in a generally horizontal attitude throughout its range of elevating movements, and adequately bracing it in such attitude to avoid tilting under the loads being elevated. More specifically, the invention aims to provide such a carriage mechanism including swinging arm linkage of generally parallelogram form having means to maintain its generally parallelogram configuration throughout an elevating range of movement and further including means for converting from the parallelogram linkage to a cross-linkage arrangement which permits the platform to be swung downwardly and forwardly around a pivot axis at the outer ends of the supporting arms of the carriage, to a stowed position clearing a road surface and normal road obstructions and generally beneath the fixed truck bed surface. The invention further aims to provide for controlled transition from the generally parallelogram action to the stowing action and to this end, the invention utilizes two pairs of swinging support arms each having one of its arms composed of slidable sections and having means utilizing a combination of power actuation and manual control operation to release the sectional arm for telescoping action and to fix the sectional arm in rigidified condition for generally parallelogram action.

A further object is to provide a tail gate lift apparatus as outlined above, including actuator mechanism with a dual-camming action for positioning, bracing and locking the platform in an elevated position closely abutting and constituting a rearward extension of the truck bed surface, and, alternatively, for positively moving the platform to a downwardly and forwardly inclined stowed position during a stowing operation and bracing and locking it in that stowed position.

For locking the extensible carriage arms in positions of maximum extension, we provide a latching mechanism, which is automatically responsive to a series of manipulative swinging movements of the carriage, to unlatch the carriage for transition from the generally parallelogram configuration to the cross-linkage arrangement involved in the stowing action; and which automatically latches the linkage in the generally parallelogram configuration when the linkage arms arrive at that relationship in an uncrossing operation.

Another object is to provide a lift mechanism including dual-camming mechanism for (1) bracing the lift platform in an elevated, extended use position, and (2) moving the platform to a downwardly and forwardly inclined stowed position and supporting it in that position; and including an arcuately shiftable cam and means for supporting and actuating such cam, with a swinging movement, between limit positions in which it cooperates with the platform and its lift actuator to effect such bracing and stowing operations.

A further object is to provide such a dual-camming mechanism in combination with an improved arrangement of hydraulic lift-actuator means, and electrically-powered pumping means, together with control means coupled to the cam-actuating means so as to be controlled thereby in a manner to provide semi-automatic control.

Other objects and advantages will become apparent in the ensuing specification and appended drawing in which:

FIG. 1 is a plan view of a tail gate lift apparatus embodying our invention shown in the stowed position, viewed in an inclined plane, looking downwardly and rearwardly as indicated by line 1—1 of FIG. 4, parts being broken away, and the side plates of the mount unit being shown in section;

FIG. 2 is a rear elevational view of the same with parts of the apparatus broken away and shown in section;

FIG. 3 is a sectional view of the same taken in a vertical plane parallel to the longitudinal axis of the truck to which it is applied, with the platform shown fragmentarily and in a position (shown in full lines) approaching its limit of elevating movement (shown in dot-dash lines);

FIG. 4 is a view, partially in side elevation and partially in section, in a plurality of vertical planes parallel to the longitudinal axis, viewed as indicated approximately by line 4—4 of FIG. 2, with parts broken away, the mechanism being shown in the stowed position;

FIG. 5 is a fragmentary sectional view of the apparatus, again in a vertical longitudinal plane and with the mechanism shown in a position approaching the beginning of the stowing action (full line position of cam) or approaching raising action (phantom position of cam);

FIG. 6 is a detailed sectional view taken on the line 6—6 of FIG. 4;

FIG. 7 is a three-positional view of the latch unit of the carriage;

FIG. 8 is a fragmentary side view of a lift apparatus embodying a modified form of the invention having means for semi-automatic actuation;

FIG. 9 is a rear elevational view of the same;

FIG. 10 is a schematic diagram of the hydraulic and electrical components thereof;

FIG. 11 is a fragmentary transverse sectional view of the same along the cam shaft, looking forwardly;

FIG. 12 is a fragamentary side elevation of the end portion of the lift platform, showing a modified form of the platform extension section;

FIG. 13 is a transverse sectional view of the cam shaft assembly of FIG. 11, taken on the line 13—13 of that figure; and FIG. 14 is a transverse sectional view of the same, looking in the opposite direction as indicated by line 14—14 of FIG. 11.

Referring now to the drawings in detail, and in particular to FIGS. 1 and 4, we have shown therein, as an example of one form in which our invention may be embodied, a tail gate lift mechanism comprising, in general, a mount frame A having means for attaching the same to the chassis C of a truck or the like near its rear end and somewhat below the level of the truck bed, indicated at B; a lift and support carriage D embodying, in general, a convertible generally parallelogram arm linkage; a platform E having a leading margin which is pivotally connected to the swingable outer extremity of the lift carriage D; a power actuator F which, in the embodiment shown, is a hydraulic piston-cylinder type actuator, arranged as a linking connection between the mount frame A and the swinging outer portion of the carriage D on an off-center actuator axis such that power lift can be applied to the carriage D; a latch assembly G for rigidifying the extensible arms of the carriage D for generally parallelogram action and controllably releasable for permitting the generally parallelogram linkage to be converted to a crossed-arm linkage for swinging the platform E to the stowed position shown in FIG. 4; an extension shelf H extending the surface of bed B; and a cam mechanism I for positively actuating the platform E (1) to its fully elevated condition locked in its position of extension of the truck bed surface, shown at E' in FIG. 3; and (2) to its stowed position shown in FIG. 4.

It may be noted at this point that the carriage D embodies two pairs of generally parallelogram linkages, pivotally fulcrumed to the mount frame A by pivots 10 and 11 respectively on vertically spaced axes, and the platform E is pivotally connected to the outer ends of these carriage arms by pivots 12 and 13 (FIG. 3) which are so related to the pivots 10 and 11 as to provide for generally paralleleogram lift action, maintaining the platform E in approximately a horizontal attitude during a lift operation. One arm of each pair of arms is of telescoping construction whereby, at a position near the upper limit of elevation, the linkage can be released for crossing as shown in FIG. 4, so that the platform E can be swung to the stowed position shown in FIG. 4. The conversion from the generally parallelogram linkage to the crossed-arm linkage is initiated by releasing the latch assemblies G so as to permit the extensible arms of the linkage to become floating guide arms, telescoping to shortened condition as required in effecting the crossed-arm relation and the movement to the stowed position.

The cam unit I utilizes a dual-camming action, the upper side of the cam cooperating with cam follower means in the pivotal connection between platform E and carriage D to effect the stowing operation, and the lower side of the cam cooperating with the same follower means to effect the final shift of the platform to its position abutting the rear end of the truck bed and providing a load supporting extension of the truck bed surface.

Hydraulic power for the actuator is provided by a pump (not shown) mounted on a bracket J fixed to frame unit A (or directly to the truck bed).

It should be explained at this point that in locking the platform in stowed position the locking action is derived from the hydraulic action of the actuator F applying a pull against the carriage D in a manner to lock it, with a toggle action, with its outer end fulcrumed against cam unit I. In its elevated position, platform E abuts an extension unit H which is anchored to the rear end of the truck bed B as an extensiont hereof.

At the point it may be observed that the invention is not restricted to application to the rear end of a truck, but could also be applied to the side or the forward end of a truck or other vehicle, or to a loading dock.

DETAILED DESCRIPTION

Mount frame A comprises a pair of mounting plates 15 adapted to be secured to respective side rails 17 of the truck chassis C in any suitable manner, as by directly welding them to the rails 17, or, alternatively, by means of bolts 16 passed through suitable apertures in the plates and in the rails 17. As thus secured to the chassis C, the plates 15 have lower portions projecting below the rails 17 and bridged by a mount tube 18 to which the side plates 15 are suitably secured, preferably by welding respective end portions of the tube 18 to the edges of circular apertures in the plates 15 through which said end portions project. For the most exact positioning of the mount tube 18, the welding of the tube to the plates 15 is performed after the latter have been secured to the chassis rails 17, and as a preliminary locating means, each end of the tube 18 is provided with an integral key 19 which is located in a notch 20 in a respective plate 15, with just a slight amount of clearance for adjustment between the tube 18 and the respective plate 15 during a particular installation. For example, during installation, the joint between platform E and carriage D can be lined up with the rear end of truck bed B, the tube 18 then positioned at the proper vertical spacing below the chassis rails 17, and the mount plates 15 then squared up with the rails 17 and secured thereto, sufficient latitude of adjustment being permitted to compensate for such irregularity in the dimensioning between the rear end of the truck bed and the chassis rails as may occur between one installation and another.

Secured to the mount tube 18 and projecting rearwardly are respective pairs of fulcrum ears 21. A respective pivot 11 is mounted between each pair of ears 21. At a higher elevation, at the center of mount tube 18, a single pair of actuator fulcrum ears 22 is secured to and projects rearwardly from the tube 18. The ears 21 and 22 are rigidly secured to the tube 18, preferably by butt welding their ends thereto.

A pair of stop brackets 25 are suitably secured, as by welding, to the under side of mount tube 18 in laterally spaced relation (each located between a pair of respective ears 21) and each having a respective nut 26 secured to its trailing end, approximately as seen in FIG. 4.

Truck bed B has an upper transverse margin (indicated at 30) in the plane of the upper surface 31 of the truck bed. The rear end of bed B overhangs the mounting frame A.

Lift carriage D comprises a pair of lift arms 35, each having a leading end pivotally mounted upon a respective pivot 11 and each having a trailing end pivotally connected by a respective pivot 13 to the leading end of platform unit E. Intermediate their ends, lift arms 35 are bridged by a transverse lift tube 36 the ends of which are rigidly secured, as by welding, to the respective arms 35. Beyond the lift tube 36, the arms 35 have intermediate portions 37 which are offset generally upwardly from the main body portions of the arm. Each arm terminates in an offset tailward terminal portion 38, connected at its end to a respective pivot 13. The downward bend in the arms 35 between their intermediate portions 37 and their leading end portions provides for positioning the lift tube 36 sufficiently below the line joining the pivots 11 and 13. The upper margins of the arms 35 could be straight from their leading ends to the points where they join offset ends 38, if desired.

The lift carriage D further comprises a pair of telescoping, extensible arms each consisting of a solid arm section 40 having an end pivotally connected to a respective pivot 12, and a leading end portion telescoped within a tubular arm section 41 the leading end of which is mounted on a respective pivot 10. At this point it may be noted that each pair of arms 35 and 40, 41 comprises a linkage which may become a generally parallel linkage by substantial inversion of the pivots 12 and 13 from the relative positions seen in FIG. 4 to the relative positions seen in FIG. 3. The generally parallelogram relationship of the arms is indicated schematically in FIG. 3 by the longitudinal center lines 35' and 40' (schematically representing in FIG. 3 arms 35 and 40, 41 respectively) and the transverse center lines 42 and 43 joining the four pivots (represented by small circles) of each pair of linkage arms.

On the other hand, the crossed-linkage arrangement is seen in FIG. 4, resulting from the inversion of the positions of the axes of pivots 12 and 13.

When the linkage arms are operating as a generally parallelogram linkage, the extensible arms, indicated at 40' in FIG. 3, will operate in compression and the lift arms, indicated schematically at 35', will operate in tension, transmitting parallelogram support through the pivots 12 and 13 to the platform E to support it in a horizontal use position shown at E' in FIG. 3. In order that the arms 40' can thus function in compression, they are latched by the respective latch units G in respective extended positions, the latch units G resisting telescoping movements. For transition from the parallelogram relationship to the crossed relationship shown in FIG. 4 in which the platform E is swung downwardly and forwardly, the latch units G are released as hereinafter described.

The pivots 10 are carried by respective stop blocks 45, each pivot 10 having respective end portions projecting from respective sides of a lower end of a respective block 45 and the arm sections 41 having respective pairs of clevis extensions 46 embracing a respective block 45 and mounted on respective ends of a respective pivot 10. Each block 45 has its upper end pivotally mounted on and suspended from a respective pivot 11 and positioned between a respective pair of mount ears 21. The upper end of each block 45 is extended to provide a stop finger 47 in which is adjustably mounted a respective adjustment bolt 48, extending through an aperture therein and fixed in a selected position of adjustment by respective lock nuts thereon (FIG. 4). The lower end of each block 45 is positioned in abutting engagement with the head of an adjustment screw 49 which is threaded into the nut 26 of a respective stop bracket 25, and secured by a lock nut 50.

It will now be apparent that by concurrently adjusting the stop bolt 48 and the stop screw 49, the respective stop block 45 can be adjusted about its respective hanger pivot 11 as required for lining up the platform E with the truck bed surface 31 in the use position E' of the platform during an installation. The vertical alignment of the pairs of pivots 10, 11 and 12, 13 is thus tilted slightly from the vertical, forwardly or rearwardly as may be required. The adjusted positions of stop blocks 45 are then secured by tightening the stop bolt 48 and stop screw 49 of each block, the former restraining the block from rearward displacement and the latter restraining the block from forward displacement.

The lift tube 36 is provided on its upper, forward side, midway between its ends, with a pair of anchor ears 53 suitably secured thereto, as by welding, for connection of the carriage D to the power actuator F.

While a preferred arrangement is one in which the pairs of pivots 10, 11, 12, 13 have their axes spaced vertically in common planes in substantially vertical positions, it should be understood that it is possible to utilize a modified arrangement wherein the planes of these pairs of pivot axes are tilted substantially from the vertical (although in each instance substantially parallel to one another) and that the generally parallelogram operation can be preserved and utilized in such modified arrangement. For example, by disposing the common plane of the axes of pivots 10 and 11 (and, correspondingly the common plane of the axes of pivots 12 and 13 when disposed in parallelogram relationship) tilted somewhat forwardly and upwardly, the parallelogram configuration can be brought to a more nearly rectangular configuration, with greater average spacing between the planes of the lift arms and control arms respectively and with consequently greater mechanical advantage (leverage) transmitted through the carriage D for supporting the load of the platform E, thus reducing to some degree the loading upon the pivots.

Platform E comprises a supporting frame which includes a transverse heel beam 55 defining its leading margin or heel, a nose beam 56 (FIG. 4) defining its trailing margin, and a pair of joists 57 (FIG. 3) disposed in laterally spaced relation (which can be outwardly of the respective carriage linkages) each joist 57 having a forward end secured, as by welding, to the heel beam 55 and a rearward end secured correspondingly to nose beam 56. An apron 58, which can be of heavy formed sheet metal, covers this frame and is secured thereto by any suitable conventional means. Apron 58 provides a flat body functioning as a supporting surface constituting an extension of the truck bed 31 in the use position E' of the platform. The platform is mounted to the pivots 12, 13 by means of pairs of hinge leaves 59, 59' rigidly secured to the leading side of heel beam 55. As seen in FIG. 2, the hinge leaves are disposed in groups of three, each including a pair of leaves 59 embracing the rear end of a respective extensible arm section 40 and attached to a pivot 12 thereof, and a pair of leaves 59, 59' embracing the terminal offset portion 38 of a respective lift arm 35 and attached to its respective pivot 13. FIG. 5 illustrates the relative locations of the pivots.

It will be understood of course that the hinge leaves 59, 59' are sufficiently heavy and securely attached to the platform frame to transmit full load carrying support to the platform in its use position E', from the carriage D.

Platform E may include an extension section 60 connected to its outer transverse margin by hinges 61 and normally retained in a folded-back position as shown in FIG. 4, by pivotal latch hooks 62 spring-loaded by over-center springs 63 adapted to hold the hooks either in the latching positions shown in full lines or in over-center retracted positions shown in broken lines in FIG. 4, resting against stops 64 on the side margins of platform E and held there by the springs 63.

It is apparent that, in swinging to the stowed position, the platform E executes a jackknifing movement with respect to carriage D. In the arrangement illustrated and described herein, the platform folds under the carriage. Alternatively, the sectional arms with their releasable latching connections between arm sections, could be utilized to accommodate the folding of the platform over the carriage (e.g. with the carriage lowered during the jackknifing operation and then elevated to a stowed position). In this event, the circumferential direction of relative orbiting movement of pivots 12, 13, and the resultant crossing of the carriage arms, would be reversed from that occurring in the particular embodiment herein disclosed.

Actuator unit F comprises a cylinder 65 having a leading end closed by a head 66 provided with an integral pivot boss 67 embraced between a respective pair of clevis ears 22 and connected thereto by a pivot 68. Operating in the cylinder 65 is a piston (not shown) having a piston rod 69 extending through a suitably sealed slide bearing 70 in a head closing the rear end of cylinder 65, the piston rod 69 terminating in a cross head 71 which is embraced between anchor ears 53 of lift tube 36 and is pivotally connected thereto by a pivot 72 mounted therein.

Cylinder 65 is provided with hydraulic lines 73 and 74 connected to its respective ends and to hydraulic chambers defined on respective sides of its piston, the line 73 being a pressure line for admitting hydraulic fluid under pressure into the rear end of the cylinder for an elevating operation and the line 74 being a relief or bleed line for returning to the reservoir of the hydraulic system, any oil that may seep past the piston.

It may now be noted that the axis of actuator pivot 68 is disposed in spaced relation above the axis of pivots 11, the longitudinal actuator axis thus being disposed in converging relation to the lift link axis 35' (FIG. 3) with a triangular relationship between the pivots 11, 72 and 68 such that the power actuation of actuator F will exert a tension pull between pivots 72 and 13, thereby elevating the lift arms 35. From pivot 72, where the pull is applied, rearwardly to the axis of pivots 12 and 13, arms 35 operate in tension to support the load of platform 58 applied to pivots 12 and 13. From pivot 72 forwardly to pivots 11, the arms 35 act in compression to carry the load of the apparatus beyond pivot 72 as the actuator pull is applied along the actuator axis F′ (FIG. 3).

Latches G each comprise a pair of latch dogs 80 embracing a respective extensible arm section 40 and pivoted thereto at 81, and a trigger 82 pivoted at 83 between an forward upper corners of the pair of dogs 80 and projecting forwardly therefrom. The trigger 82 has, at its forward end, a finger 84 overhanging a forwardly facing abutment shoulder 85.

The latch dogs 80 have squared forward ends 86 (which are preferably hardened) for abutting compressive engagement with the rear end of a respective tubular arm section 41, thus to rigidify a respective extension arm 40, 41 in compression (preventing shortening of the arm) for operation of the arms as compressive struts in the parallelogram linkage 35′, 40′, 42, 43 of the schematic showing in FIG. 3. In the full line positions of the parts in FIG. 3, they are approaching this parallelogram relation, with the abutment ends 86 of the latch dogs 80 in generally parallel, spaced relation to the ends of tubular arm sections 41. At the use position E′, full contact is established between the abutment ends 86 and the ends of arm sections 41.

Secured to the upper sides of arm sections 41 are respective trip lugs 87, positioned for engagement by the abutment shoulders 85 of respective triggers 82 (FIG. 7) for tilting the dogs 80 to inoperative positions. In FIG. 7, the point of engagement of a trigger 82 against a lug 87 is shown in full lines. This position is arrived at by extending the arm section 40 away from arm section 41 at a time when trigger 82 is riding above the lug 87 as shown in FIG. 3, the trigger being drawn across the lug 87 until it drops by gravity into the engaged (full line) position of FIG. 7. By then reversing the movement of arms 40, telescoping them into arm sections 41, the trigger 82 will function as a stop, its forward-facing abutment 85 blocked by trip lug 87, and because its pivotal connection 83 to the dog 80 is disposed above a line between the point of engagement of shoulder 85 against lug 87 and the dog pivot 81, the trigger 82 and dog 80, with a toggle action, will buckle upwardly to the phantom position 80′ (shown by the dot-dash line) of FIG. 7 where the lower forward corner of dog 80 will clear the end of arm section 41. Such further shortening of the control 40, 41 as may be required, is then permitted by the forward sliding of dog 80 against the upper rear corner of arm section 41 (e.g. to the second phantom position 80″ shown in dash lines in FIG. 7) should the occasion require such action.

A coil spring 88 is connected under tension between each dog 80 and its corresponding arm section 41, through suitable anchor clips seen in FIG. 4, and operates to spring-load the dog 80 toward a position of substantial alignment with its respective arm section 40. Spring 88 is operative to place the dog back in a position for engagement of its abutment end 86 against the end of arm section 41 in an operation in which the arms of carriage D are restored to their parallelogram relationship from the crossed relationship shown in FIG. 4. At this point it may be noted that throughout the crossed relationship, with the control arm shortened, the latch dogs 80 are necessarily maintained in raised inoperative positions.

The restoration to the parallelogram relationship involves the extension of the control arm 41, 40 somewhat beyond its normal length in the parallelogram, to bring the dogs 80 to positions clearing the ends of arm sections 41 as in FIG. 3. The invention provides a means for positively determining a position of adequate clearance between the ends of dogs 80 and the ends of arm sections 41, comprising a divider tooth 90 secured to one side of each dog 80 in a position clearing the adjacent side face of the respective arm section 41 and projecting diagonally beyond the lower forward corner of the dog, for engagement with a divider pin 92 secured to and projecting laterally from that side of the arm section 41. The divider tooth 90 has a lower face 91 adapted to ride upon the pin 92 as the dog 80 is retracted past the end of arm section 41, until adequate clearance is determined, and has an upper face which is cut back at an acute angle to lower face 91 so as to provide clearance for a free drop of the point of tooth 90 from the pin 92 so that the dog 80 will drop into its proper blocking position for full abutting engagement with the end of arm section 41 before such engagement actually occurs. The lower face 91 is slanted downwardly in forwardly diverging relation to the lower face of dog 80, so that tooth 90, riding on pin 92, will lift the corner of the dog slightly above the upper face of arm section 41 as it nears the latch-engaging position. Thus, if the dog should be riding against the upper face of the arm 41 during its retracting movement responsive to extension of arm section 40, it will be lifted out of such engagement just before it is released to drop into its operative abutting position.

One latch dog 80 of each pair has a tail finger 93 projecting from its rear end in a position to engage an actuator pin 94 (secured to and projecting from an adjacent side surface of the respective lift arm 35) when the arms of carriage D approach their crossed relationship (FIGS. 4 and 5). The parts 93, 94 function to positively maintain the latch dog 80 in a raised, inoperative position during a stage in the uncrossing of the arms of carriage D and restoration of the arms to the parallelogram relationship, when the arm section 40 is being telescoped into arm section 41. To effect the complete uncrossing, it is necessary that the control arm 40, 41 be shortened from an extended length such as that seen in FIG. 4, longer than the arm 35, to a condition shorter than the arm 35. During this transition, as the control arm 40, 41 approaches equal length with arm 35, it would be possible for the dog 80 to engage the end of arm section 41 and block the completion of the uncrossing movement if in any manner it has been permitted to drop back to substantial alignment with arm section 40 in approaching the equal length position. The latch raising parts 93, 94 prevent this from occurring.

Extension shelf H comprises simply a modified angle section, extending transversely of the truck bed B, comprising a flat top member 100, a front flange 101 having suitable means for securing the same to the rear end of the truck bed B and a rearward lip 102, the lip 102 extending downwardly to a point where it just clears the roller ears 123 in the fully elevated position of platform shown at E′ in FIG. 3, and being notched at 104 (FIG. 2) to clear ears 59, 59′ when platform E is in position E′. The shelf H may be of rolled heavy sheet metal channel fitted with laterally spaced gussets 103 suitably secured thereto as by welding and providing bracing connections between mounting flange 101 and lip 102. The camming unit I is largely contained and protected within shelf H, and the heel of platform E is received therein in the stowed position.

Cam mechanism I comprises a flat cam 110 having a tail portion 111 pivotally mounted upon a shaft 112 and positioned between a pair of laterally spaced gussets 113 substantially midway between the side extremities of shelf H. Shaft 112 is journalled in the gussets 113 and in one of the end gussets 103, projecting through the latter and terminating in a handle 114 for rotating the shaft and thereby swinging the cam 110 which is secured to the shaft. Cam 110 has a camming head 115 providing alternate camming surfaces 116 and 117, 118 on its upper and lower sides respectively. A nose 119 provides a dividing point between the upper cam surface 116 and the lower cam surface 117, 118. While it is possible to utilize a continuous lower cam surface of single curvature, some advantages are obtained in the arrangement shown wherein the two sections 117, 118 of the lower cam surface are arranged approximately as a dihedral angle.

A cam follower roller 121 is mounted upon a roller shaft 122 which is carried by a pair of laterally spaced ears 123 anchored to the heel beam 55 of platform E. Roller 121 operates on the upper cam surface 116 for effecting the stowing action seen in FIG. 4, and on the lower cam surface 117, 118 for effecting the final positioning of platform E in its use position E' (FIG. 3).

Cam 110 has its lower forward corner notched to provide, beneath the tail 111, an abutment shoulder 125 adapted to engage against an adjustable positioning stop screw 126 which is mounted in a nut 127 secured to the mounting flange 101 of shelf H and is preferably secured in any selected position of adjustment by a lock-nut as shown. Engagement against the stop screw 126 determines a lower limit position of the cam 110 in which its upper cam surface 116 is properly positioned to cooperate with roller 121 to initiate a stowing operation.

An upper limit position, shown in FIG. 4, is determined by engagement of a stop lug 128 projecting laterally from one side of cam 110 against an opposed edge of an adjacent gusset 113, as indicated in FIG. 4. In this position, the stowing operation is completed by the engagement of roller 121 against a hook 130 overhanging the upper extremity of upper cam surface 116, the cam 110 being raised from its lower limit to its upper limit position during the stowing operation. The coaction between the follower roller and cam then becomes an over-center toggle action ending in a partial locking action in which a substantial portion of the platform load is assumed by the cam.

Cam 110 is spring-biased toward its lowered position by a mouse-trap spring 131 coiled around the pivot shaft 112 and having respective ends anchored to the shaft 112 and to a gusset 113.

The limited vertical swinging movement afforded to the cam, provides for selective positioning of the dividing nose of the cam in either of two positions, namely (a) a normal lowered position, in which the upper cam surface is in position to be engaged by the follower roller, and (b) a raised position (effected by manual action) in which the lower cam surface is in position to be engaged by the follower roller.

OPERATION

In general, the operation of our improved tail gate lift apparatus involves the lowering of platform E to a loading position approximately parallel to the ground surface, with the carriage D and the platform E both extended rearwardly from mount A. In most installations, the carriage D will have a downward and rearward slant from the mount A to the platform E in its loading position, the degree of slant depending upon the height of mount A which may vary in different installations. Also, the invention contemplates the possibility of arranging the linkage of carriage D either to provide uniformly level attitude of platform E in all positions of its range of movement (utilizing exactly parallelogram linkage) or, alternatively the linkage in its generally parallelogram relationship may be somewhat modified from a true parallelogram configuration so as to provide a slight downward and rearward inclination for the platform E in its lower limit, loading position and gradually bringing it to a level attitude in its fully elevated, use position.

After loading an article of freight onto the platform, the actuator F is actuated to apply a pull to the lift arms 35 above the plane of the axes of pivots 11 and 13, thereby elevating the carriage D and the platform E which will remain supported by the parallelogram linkage in a leveled or substantially leveled throughout such elevating movement.

In the approach of the platform E toward the upper limit position, the cam 110 will be disposed in its downwardly tilted position as shown in phantom in FIG. 3, and the roller 121 will completely clear the cam 110. As the platform nears the fully elevated position, the heel beam 55 will come to a position closely adjacent to the lip 102 of shelf H, and the platform will be fully supported by the carriage D in the use position E' of FIG. 3. As previously stated, this will result from the parallelogram action of carriage D, with latch dogs 80 in full abutting contact with the upper ends of arm sections 41, and with the lift arms 35 acting in tension above the axis of pivot 72 where the lift is applied.

When the load has been moved from the platform onto the truck bed and it is then desired to move the platform to a stowed position, the actuator F is operated to lower the carriage D until the heel of platform E arrives at a position completely clearing the cam mechanism I, as in FIG. 5. The operator then grasps the trailing edge of platform E, lifting it so as to draw the upper control arms 40 outwardly from their guide arms 41 sufficiently to cause the triggers 82 to drop into tripping engagement with their respective trip lugs 87, shown in full lines in FIG. 7. The operator then lowers the platform, causing the control arm sections 40 to move back into their tubular guide arm sections 41, whereupon the latch dogs 80 will be tilted upwardly to their released positions by the toggle action hereinbefore described, and the platform can then be permitted to be dropped by gravity to the hanging position shown in FIG. 5.

During the stowing operation, as the platform swings downwardly following the movement of latch dogs 80 to their inoperative positions, the pivots 12 will describe an arcuate path of movement around the axis of pivots 13 upwardly through an arc of approximately 90 degrees, resulting in the shifting of the arms of carriage D from parallelogram relationship to crossed relationship, the arm sections 40 sliding freely into the guide arm sections 41 and the sectional arm 40, 41 thus attaining a floating characteristic. As the telescoping action of the arm sections 40 in arm sections 41 progresses, the latch dogs 80 will be held elevated by their triggers 82 until their divider teeth 90 pass above the divider pins 92, and the lower sides of dogs 80 engage against the upper rear corners of arm sections 41 whereupon the dogs will be tilted further upwardly by camming action between the lower sides and these corners of arm sections 41 to the phantom position 80'' of FIG. 7. In this position, triggers 82 will be cantilever-supported by their respective latch dogs 80 in elevated, in operative positions by abutting engagement of their hinged ends against the adjacent ends of their respective dogs 80, as shown fragmentarily in phantom in FIG. 7. In such inoperative positions the triggers are prevented from interfering with the dropping of latch dogs 80 back to their operative positions compressively abutting the ends of arms 41.

From this position shown in FIG. 5, the carriage is again elevated by actuation of unit F, and the roller 121 will then ride along the upper face 116 of cam 110 (starting the stowing movement of platform E) until it engages the hook 130. Continued elevation of the carriage will cause the cam to be elevated by the contact of roller 121 with hook 130 until it reaches the upper limit position seen in FIG. 4. At the same time, the platform E will be swung from its depending position of FIG. 5 to its inclined stowed position shown in FIG. 4, by camming action of roller 121 against upper cam face 116, plus a toggle action of cam 110 against the heel of platform E which is developed between the pivot 112, the roller 121 and its point of contact with hook 130, and the pivot 13, commencing when full pressure contact is established between roller 121 and the bottom of saddle 140 defined between hook 130 and cam face 116, this point of full pressure contact occuring somewhat above the line joining pivots 112 and 13, whereby there is an upward breaking action in the toggle operation in which roller 121 is forced upwardly, thus exerting a clockwise leverage against the heel of platform E as viewed in FIG. 5, tilting the platform forwardly. The platform is hydraulically locked in this forwardly tilted, stowed position (seen in FIG. 4) by the unit F which is left with hydraulic pressure sealed therein and its piston rod 69 correspondingly held under tension.

When it is desired to release the platform from the stowed condition for further lift operation, the actuator F is operated to relax the pull against carriage D until the carriage is dropped back to the position shown in FIG. 5, the platform E swinging back to a free-hanging vertical position. The operator then grasps the handle 114 and turns it to shift the cam 110 to its raised position seen in FIG. 3, and shown in phantom in FIG. 5. At this point it may be noted that the arms of carriage D remain in crossed relation at this stage of operation, and that the latch dogs 80 are held in elevated, inoperative positions by engagement of tails 93 against actuator pins 94. Having lowered the heel of the platform until roller 121 is below the level of the raised cam 110, the actuator F is then operated to elevate carriage D until roller 121 engages the lower cam face 117, 118. In the mechanism with the particular configuration and proportioning shown herein by way of example, this will occur near the angle between the sections 117 and 118 of the lower face. Elevation of the carriage D is continued, with the upward movement of roller 121 blocked by the cam, while continued upward pressure is applied from the ends of lift arms 35 to the pivots 13, thereby causing the latter to swing upwardly and then forwardly in an arcuate path about the axis of roller 121 (which may be approximately coaxial with pivots 12) with the platform swinging upwardly from approximately the position shown in FIG. 5 to approximately the position shown in full lines in FIG. 3. This stage of movement will effect the uncrossing of the arms 35 and 40, 41, restoring them to their approximately parallel relationship shown in FIG. 3. At the same time, the latch lifting tails 93 will separate from contact with actuator pins 94, permitting each latch dog to be spring-retracted to the position where divider teeth 90 will rest upon divider pins 92, and continuing past the point where separation occurs between the abutment ends 86 of the latch dogs 80 and adjacent upper ends of arm sections 41, to the point where divider teeth 90 clear and drop away from the divider pins 92, restoring the latch dogs to the position shown in FIG. 3. The unit F is then actuated to slightly relax the pull of lift arms 35, permitting the platform E to settle back to a level attitude and the arms 40, 41 to shorten sufficiently to bring the blocking ends 86 of the latch dogs into abutting engagement with the ends of arm sections 41, whereupon the parallelogram arrangement of the arms of carriage D is restored, and the sections of control arm 40, 41 are again placed in compressive engagement with one another to support the load of platform E transmitted through pivots 12 and 13. The unit F is then actuated to further relax the pull on carriage D, lowering it sufficiently to free the cam unit I from the roller 121, permitting the cam 110 to drop back to its normal lowered position. The platform can then be either elevated to its use position E′ or lowered to the ground for a loading operation.

The broken line E″ of FIG. 3 is to be understood as indicating approximately the upward inclination of platform E with reference to carriage D when it is lifted manually to unlatch the unit G preparatory to swinging the platform downwardly to the stowed position, but the lifted position of the platform occurs, not at the level shown in FIG. 3, but at a lower level where the heel of platform E completely clears cam unit I as hereinbefore described.

*Modified form—FIGS. 8–14*

In the modified form of the invention shown in FIGS. 8–14, provision is made for semi-automatic control of the various operations of the lift. In general, it provides for linking the cam-actuator shaft 112 to controls for the motor which drives the hydraulic pump and for a valve for bleeding the hydraulic cylinder, such as to dispense with independent operation of these controls, the operating handle 114 being utilized for operating a motor starter switch and a bleed valve as well as cam 110. By lowering the handle 114 to a position designated "Down," the apparatus will operate to bleed sufficient hydraulic fluid from the actuator F to lower the lift carriage D to a transition position from which it can be moved to the stowed position, and by then raising the handle 114 to an intermediate position (designated "Up") in which the hydraulic pump is started and operated, the movement of the platform to the stowed position of FIG. 4 will be automatically completed.

Referring now to FIG. 10, wherein the hydraulic mechanism and its controls are shown schematically, the hydraulic fluid for energizing actuator F is delivered under pressure from a pump P of a positive displacement type (e.g. a gear pump) through a pressure line 140 leading from the pump outlet, thence through a check valve 141 and the hydraulic line 73 to the pressure side of actuator F (a breather fitting 741 being utilized at the opposite end of the cylinder instead of the connection 74 seen in FIG. 4). The delivery line 73 also serves for bleeding the pressure side of actuator F through a bleed line 142 and a bleed valve 143 having a normal position (shown schematically in FIG. 10) in which it closes the bleed line 142, and a second position in which it provides communication between the bleed line 142 and a return line 144 leading to a hydraulic fluid reservoir R. Referring now to FIG. 8, the valve 143 is incorporated physically within the pump P and is actuated by an actuator lever 145. In the form shown as a preferred embodiment, the valve 143 is of a rotary type and the lever 145 swings arcuately from a valve-closing position shown in full lines in FIG. 8 to a valve-opening position shown in phantom. When in the latter position, the valve 143 permits fluid to bleed from the actuator F through the fluid lines 73, 142 and 144 to the reservoir R. Check valve 141 is normally closed, and when bleed valve 143 is also closed, these two valves cooperate to hold hydraulic fluid trapped in actuator F until bleed valve 143 is opened, thus supporting the platform E in any position to which it has been elevated.

Continuing to refer to FIGS. 8 and 10, in order to protect the system against damage from excessive hydraulic pressure a maximum operating pressure is established by a pressure relief valve 146 connected to the pump delivery line 140 and having a return 147 to the reservoir R. The relief valve 146 as well as the bleed valve 143 and check valve 141 can be physically incorporated within the pump P. Pump P has an inlet receiving fluid from reservoir R through an inlet line 148. The pump is mounted (e.g. to mount tube 18) by suitable bracket means 149.

The pump P is driven by an electric motor M through a mechanical drive connection indicated schematically at 150. From a suitable source of electric power 151, the motor is energized by closing a normally-open push-button swich S carried by a suitable support bracket 152 in fixed association with the pump unit P. Actuator lever 145 normally rests in a neutral position in contact with the push button of the switch S without closing it. By moving the lever 145 a short distance against the push button, the switch S will close the circuit to the motor M through an energizing line 153 and the pump P will thereby be operated so long as the switch S is held closed.

Conventional spring-loading is utilized in the switch S to return it to its normally open position when the lever 145 is returned to its neutral position (shown in full lines in FIG. 8).

Referring now to FIGS. 9 and 11, the crank shaft 112, instead of being secured directly to the cam 110, is coupled thereto through a lost motion rotary drive connection in which the end of the shaft 112 is received in a bearing collar 160 having an integral dog clutch tooth 161 of segmental-cylindrical form projecting therefrom along one side of shaft 112. Collar 160 is secured upon the end of a stub shaft 162 which extends through and is journalled in the spaced gussets 113, in end-to-end alignment with shaft 112. Cam 110 has a hub 163 which is secured to the shaft 162 (e.g. bolted as indicated) and is normally yieldingly held in its lowered position seen in FIG. 8, by the torsion spring 131.

The lost motion connection between shaft 112 and cam 110 further includes a drive pin 164 secured in and projecting radially from shaft 112 in a position to engage the jaw 161. In the neutral position of crank handle 114, the pin 164 is backed away from the jaw 161 (FIG. 14) sufficiently so that the handle 114 can be shifted from the neutral position to a position in which the switch S is closed and the pump P operating, without imparting movement to the cam. Movement beyond this intermediate pump-operating position will be transmitted through pin 164 and jaw 161 to the cam to shift it to its raised position of FIG. 3, for elevating the platform to its use position E'.

For actuating the switch-valve actuator lever 145, a control lever 167 is mounted on the shaft 112 with a lost-motion rotary drive connection comprising a hub 168 having an integral axially projecting segmental-cylindrical jaw 169 normally engaged against a stop pin 170 fixed in and projecting radially from the shaft 112. On the opposite side of the lever from the jaw 169, a torsion spring 171 encircles the shaft 112, the spring 171 having a hooked end 172 engaged against the lever 167 and its opposite end anchored at 173 to the shaft 112. The torsion spring 171 is preloaded by the engagement of stop pin 170 against jaw 169, sufficiently to provide adequate torque for closing the switch S through transmitting linkage comprising a push rod 175 linked at 176 to the lower end of lever 167 and linked at 177 to the actuator lever 145. A coil spring 178 is connected under tension between the lever 167 (at a point above the connection 176) and an anchor clip 179 secured on rod 175, and functions to hold the actuator lever 145 lightly against the push button of switch S so as to continuously maintain contact therewith in the neutral position of handle 114 and the actuating linkage. The spring 178 also assists in normally positioning the operating handle 114 in its neutral position, from which it can be moved downwardly against the light yielding resistance of the spring 178 (which is stretched as the angle subtended between lever 167 and push rod 175 is increased). The neutral position is determined by engagement of cam 110 against its stop in its normal position.

When the actuator lever 145 has closed the switch S and its push button is bottomed out, no further movement of control lever 167 in response to upward movement of control handle 114 is possible. However, the control handle 114 can be moved from its intermediate, switch closing position up to its cam-shifting position by lost motion between the stop pin 170 and the jaw 169 which is permitted by further twisting of the torsion spring 171 beyond its preload position.

The operation of the semi-automatic control apparatus of FIGS. 8–14 will now be described, commencing with a position of the platform where it has been lowered to a loading position adjacent the ground surface. In this position (as well as in any other static position of the platform to which it has been moved) the control handle 114 will rest in its neutral position shown in full lines in FIG. 8, being yieldingly held in position by the torsional spring-loading applied by spring 131, holding cam 110 in its normal position backed against stop bolt 126, and by linkage spring 178, which restrains lever 167 (and crank 112, 114) from counter-clockwise movement from their normal positions seen in FIG. 8.

To elevate the platform to its use position E', it is only necessary to shift the handle 114 to the "Up" position, whereupon the resulting rotation of shaft 112 will be transmitted through spring 171 to lever 167 and thence through link 175 to actuator lever 145 to close the starting switch S, thus starting the operation of pump P and operating the actuator F to elevate the platform (whenever fluid is being pumped into the actuator F, check valve 141 will open to permit the flow). The cam 110 will remain in its normal position. Thus the elevation of the platform to its use position E' from its fully lowered, loading position or from any intermediate position, is effected by shifting to the "Up" position without the necessity for actuating the motor switch by a separate control. The foregoing is applicable only to elevating operations starting with the platform supported in a leveled, extended position, the operation from the stowed position being described hereinafter.

When elevation of the platform is completed, the handle 114 is released and allowed to return to its neutral position under the pull of tension spring 178 and the spring-loading in switch S. Any continued operation of pump P after the actuator F has reached the limit of its stroke during elevation of the platform, would result in bypassing the pump discharge through relief valve 146.

Movement of the platform from its use position E' to its stowed position requires two movements of operating handle 114. The handle is first moved to its "Down" position, shifting the actuator lever 145 to its position shown in phantom in FIG. 8 in which the bleed valve 143 is opened so as to permit hydraulic fluid to bleed from actuator F under the weight of the platform and carriage D as the latter sags to its transition position shown in FIG. 5 (but with the carriage continuing to support the platform in its leveled, extended position). The handle 114 is then returned to its neutral position (causing the valve 143 to close under its own spring-loading) to stop the carriage in the transition position and the platform is manually lifted to the upwardly-tilted latch-release position indicated generally at E" in FIG. 3, the latch G being thereby released to permit the shortening of the control arms 40, 41, the platform is released and permitted to swing downwardly by gravity to its depending position of FIG. 5. The handle 114 is then moved to the "Up" position, restarting the motor and pump and causing the actuator F to again elevate carriage D. In this position of the operating handle 114, the cam 110 remains in its normal lowered position and thus the operation illustrated in FIG. 5 will ensue, the roller 121 riding upwardly along the rear ramp 116 of cam 110 to effect the forward swinging of platform E to its stowed position, and finally raising the cam and effecting the over-center locking hereinbefore described. When this has been effected, the operating handle 114 is permitted to return to its neutral position, reopening switch S, stopping the operation of the pump, and trapping the hydraulic fluid in the actuator F by closing check valve 141 (bleed valve 143 remaining closed).

FIG. 8 illustrates another improvement in which the pin 92 of FIG. 3 is replaced by a block 921 of parallelogram shape, for engagement with the divider tooth 90, parts 90 and 921 being per se identical parts, and lug 921 resisting breakage to which pins 92 have been subject. The cooperative action of these parts is substantially the same as described in connection with FIGS. 1–7.

The latch dog 80 of FIG. 8 is further modified in not having the tail finger 93 of FIG. 5, the parts 93 and 94 being eliminated in FIG. 8 as being unnecessary.

FIG. 12 discloses a further improvement in the apparatus, wherein the platform extension section 601 is provided with arms 602 which embrace the end of platform E and are pivoted thereto by pivots 611. Extension section 601 has a heel portion 603 which is positioned so as to clear the adjacent end corner of platform E as the extension section swings to its extended position, and to then establish abutting engagement with the abutment block 56 on the end of the platform, as indicated in phantom, to brace the extension with its load-supporting surface in a common plane with platform apron 58.

In the carriage D, each sectional arm 40, 41 is articulated for effective length-adjustment to accommodate the orbiting movement of pivots 12, 13 incidental to the downward folding of the platform E toward stowed position. The articulated feature may be developed from the longitudinally slidable telescoping sectional arm structure shown in the drawing, or any known equivalent thereof for length-adjustment purposes, such as a jackknifing assembly of arm sections hinged to one another end-to-end.

Where the platform movement starts from the stowed position, handle 114 is first moved to "Down" to lower the platform heel sufficiently to clear the cam 110, and the handle 114 is then shifted without pause through the "Up" position to the "Cam" position, simultaneously raising the cam and starting the motor, which causes actuator F to raise the platform heel against the lower side of the cam and to thereby effect the upward swinging of the platform to its extended, leveled position as hereinbefore described. In the semi-automatic operation of the apparatus of FIGS. 8–11, this operation proceeds to completion in response to the single control operation of raising handle 114 to "Cam" position.

We claim:

1. In a stowable tail-lift apparatus, in combination: a mount; a lift platform; a lift carriage comprising two pairs of arms, each pair of arms having, at their one ends, a first pair of spaced pivots by which they are fulcrumed on said mount, and having, at their other ends, a second pair of spaced pivots by which they are pivoted to a margin of said platform to provide a linkage adapted to assume a generally parallelogram arrangement in which said pivots of each pair are substantially vertically spaced, for elevating said platform while supporting it in a generally level attitude extended outwardly from said linkage with reference to said mount, throughout the elevating movement; releasable means in said linkage, such as to permit one of said second pair of pivots to be orbited around the other so as to reposition said pivots with the lower pivot shifted inwardly of the upper pivot for transition of said linkage by operation of said platform swinging downwardly in response to gravity, from said generally parallelogram arrangement to a crossed-arm arrangement wherein said platform is jackknifed downwardly to a depending position from which it can be swung forwardly to a position stowed below and behind said carriage; and power means for applying lift to said carriage.

2. Lift apparatus as defined in claim 1, wherein one arm of each pair is a sectional arm comprising arm sections attached to one another for relative longitudinal sliding movements, and wherein said releasable means comprises latch devices for limiting such relative sliding movement in the sectional arm so as to render it operative for transmitting platform-elevating and leveling force in said generally parallelogram arrangement, and releasable to convert the sectional arm to a floating condition in which it will permit said pivot-orbiting movement.

3. Apparatus as defined in claim 2, wherein the other arm of each pair is connected to said power means to receive lift therefrom and is disposed above said sectional arm; wherein said releasable latch device is arranged to establish a connection in compression between the sections of said sectional arm to maintain it in an extended condition for compressive lift action, from which it can be foreshortened by release of said latch device; and including manually controlled means for causing said platform to swing forwardly and upwardly from said depending position to said stowed position in response to lift applied to said other arms by said power means.

4. Apparatus as defined in claim 3, wherein said sectional arm is a lower arm of said parallelogram linkage operating in compression and comprises a tubular guide section and an arm section of bar form telescoped therein, wherein said releasable latch device comprises a dog pivoted to said arm section of bar form for swinging movement to a position abutting the end of said tubular guide section and functioning as a compression load-bearing link in said sectional arm to maintain the latter extended; and wherein said other arm of each pair is operative in tension for leveling said platform when said sectional arm is thus extended.

5. In a stowable tail lift apparatus, in combination: a mount; a lift platform; a lift carriage comprising respective lift and control arms having respective leading ends fulcrumed on said mount on vertically-spaced transverse axes and having trailing ends, said platform having at a leading margin thereof, a heel which is connected to said trailing ends by transverse pivots spaced from one another at substantially the same spacing as said fulcrum pivots in a plane substantially at right angles to the plane of said platform, said control arms comprising respective arm sections embodying slide means connecting them for longitudinally sliding shortening and extension of said control arms, and means for latching said sections at a length of said control arms substantially equal to that of said lift arms, with said arms, said mount and said heel collectively constituting a parallelogram linkage for sustaining said platform in a substantially levelled attitude throughout a range of elevating movement, said latching means being releasable to permit changing the length of said control arms such as to permit the pivots joining their trailing ends to said platform heel to orbit around the pivots joining said heel to the trailing ends of said lift arms, and to cross the longitudinal axis of the latter so as to dispose said arms in crossed relation while permitting said platform to swing toward a depending stowed position; and power actuator means operative between said mount and said lift arms for elevating said carriage and thereby elevating said platform.

6. Apparatus as defined in claim 5, wherein said latching means comprises a dog having a tail end pivoted to one of said control arm sections and an abutment end engageable compressively against an adjacent end of the other arm section; and means on said abutment end, engageable with said other arm section in response to extension of said control arm followed by shortening thereof, to tilt said dog to an inoperative position such that said control arm can shorten so as to permit the crossing of said arms.

7. In a stowable tail-lift apparatus, in combination: a lift platform; a lift carriage comprising a lift arm and a sectional arm comprising a tubular guide section and a bar section telescopically slidable therein; a first pair of pivots connecting ends of said arms to a horizontal margin of said platform on axes parallel to said margin and spaced from one another in a plane transverse to the plane of said platform; a support; a second pair of pivots fulcruming the other ends of said arms on said support on spaced horizontal axes so arranged as to provide for parallelogram action of said carriage while elevating said other ends so as to elevate said platform while supporting it in generally leveled attitude throughout the elevating movement; a latch dog pivotally mounted on said bar section and having a swinging end engageable with the end of said guide section in end-abutting relation such as to impart to said sectional arm the characteristic of a compressive load-bearing strut in said parallelogram action of the carriage, said latch dog being tiltable to a release position in non-obstructing relation to said guide section end, thereby allowing free yielding movement of said bar section into said guide section in response to jackknifing of said platform with reference to said carriage to a stowed position, with one of said first pair of pivots orbiting around the other and said arms assuming a non-parallelogram arrangement; and power means for lifting said carriage.

8. Lift apparatus as defined in claim 7, wherein said latch dog is arranged to tilt upwardly to release position wherein its free end clears the end of said guide section, and including a trigger pivoted to said free end and projecting therefrom in overhanging relation to said guide section, and a trip lug on the latter, engageable by the free end of said trigger so as to tilt said dog upwardly to said release position with a toggle action in response to telescoping movement of said bar section into said guide section.

9. In a stowable tail-lift apparatus, in combination with an elevated load-supporting bed; a cam mounted on a margin of said bed; a fixed support below said bed; a lift platform; a lift carriage comprising a pair of arms having one pair of ends pivoted to said support on spaced parallel transverse mounting axes and an opposite pair of ends provided with respective pivots connecting them to said platform on spaced axes parallel to said mounting axes and disposed in a plane transverse to the plane of said platform; one of said arms comprising respective sections having means connecting them for relative longitudinal sliding movements; latch means for releasably connecting said sections to one another at a length of said one arm such as to establish a generally parallelogram arrangement of linkage in said carriage and such as to support said platform in a generally leveled attitude throughout a range of lift of said platform by said carriage, release of said latch means freeing said arm sections for free relative sliding movement such that one of said connecting pivots can execute orbital movement around the other to accommodate downward jackknifing movement of said platform with respect to said carriage to a stowed position beneath said carriage; a power actuator for applying lift to said carriage to elevate it in a movement swinging upwardly about said mounting axes; and cam follower means on said platform, near the axis of said one connecting pivot, engageable with said cam to effect said orbital movement and said jackknifing movement of the platform in a stowing operation, in response to upward movement of said carriage.

10. Apparatus as defined in claim 9, wherein said cam is pivoted to said bed on a transverse axis for swinging movement in a vertical plane parallel to the paths of swinging movement of the ends of said carriage arms around said mounting axes, wherein said cam has an upper camming surface engaged by said follower means for said jackknifing movement, and has at the upper extremity of said upper camming surface an overhanging hook engaged by said follower means during said stowing operation, and developing a camming action between said cam and the platform in the final stage of the stowing operation, whereby a portion of the platform load is assumed by the cam, reducing the load on said actuator.

11. In a stowable tail-lift apparatus, in combination with an elevated load-supporting bed; a cam mounted on a margin of said bed and having upper and lower cam surfaces and a nose defining a dividing point between said surfaces; a fixed support below said bed; a lift platform; a lift carriage comprising a pair of arms having one pair of ends pivoted to said support on spaced parallel transverse mounting axes and an opposite pair of ends provided with respective pivots connecting them to said platform on spaced axes parallel to said mounting axes and disposed in a plane transverse to the plane of said platform; one of said arms comprising respective sections having means for releasably connecting said sections to one another at a length of said one arm such as to establish a generally parallelogram arrangement of linkage in said carriage and such as to support said platform in a generally leveled attitude throughout a range of lift of said platform by said carriage, release of said latch means freeing said arm sections for free articulating movement such that one of said connecting pivots can execute orbital movement around the other to accommodate downward jackknifing movement of said platform with respect to said carriage to a stowed position beneath said carriage; a power actuator for applying lift to said carriage to elevate it in a movement swinging upwardly about said mounting axes; and cam follower means on said platform, near the axis of said one connecting pivot, engageable with said cam to effect said orbital movement and said jackknifing movement of the platform in a stowing operation, in response to upward movement of said carriage; said cam being pivoted to said bed on a transverse axis for swinging movement in a vertical plane parallel to the paths of swinging movements of the ends of said carriage arms around said mounting axes, said upper cam surface being positioned for engagement by said follower means for stowing operation when said nose is in a lowered position and said lower cam surface being positioned for engagement by said follower means for swinging the platform upwardly from a depending position to a leveled extended position when said nose is in a raised position; and manually operable means for selectively shifting said cam to one of its positions.

12. Apparatus as defined in claim 11, including means yieldingly biasing said cam to a normal position from which it is shifted to an alternate position by said manually operable means.

13. Apparatus as defined in claim 11, wherein said cam normally assumes a lowered position, and wherein said manually operable means comprises a transverse shaft on which said cam is secured, said shaft being rotaably mounted to said bed and having at one end a handle by which it can be rotated to move said cam to a raised position.

14. Apparatus as defined in claim 11, wherein said cam normally assumes a lowered position from which it can be manipulated to a raised position by said manually operable means; and wherein said cam has, at the upper extremity of said upper camming surface an overhanging hook engaged by said follower means during said stowing operation, and developing a toggle action between said cam and the platform in the final stage of the stowing operation, whereby a portion of the platform load is assumed by the cam, reducing the load on said actuator.

15. In a stowable tail-lift apparatus, in combination: a lift platform; a lift carriage comprising an upper lift arm operable in tension and a lower sectional compression arm comprising a guide section and a bar section coupled to said guide section for relative longitudinal sliding movement; a first pair of pivots connecting ends of said arms to a horizontal margin of said platform on axes parallel to said margin and spaced from one another in a plane transverse to the plane of said platform; a support; a second pair of pivots fulcruming the other ends of said arms on said support on spaced horizontal axes so arranged as to provide for parallelogram action of said carriage while elevating said other ends so as to elevate said platform while supporting it in generally leveled attitude throughout the elevating movement; latch means for selectively providing a compression connection between said bar section and said guide section to maintain in an extended condition in which it will impart load-carrying parallelogram action to said carriage, said latch means being releasable to free said compression arm sections for relative sliding foreshortening movement accommodating downward swinging of said platform with reference to said carriage to a stowed position, with one of said first pair of pivots orbiting around the other and with said arms assuming a non-parallelogram arrangement; and power means for lifting said carriage.

16. Apparatus as defined in claim 15, said latch means comprising a dog having one end pivoted to one of said compression arm sections for upward tilting to a release position, and including means for automatically releasing said latch in response to manual upwardly tilting of said platform around its pivotal connections to said carriage, said last means comprising a trigger pivoted to and projecting from the other end of said latch dog and a stop on the other compression arm section, behind which said other end of the dog is adapted to engage in response to drawing of said sections apart, said trigger becoming operative to tilt said dog upwardly when said arm sections are drawn together.

17. Apparatus as defined in claim 15, including means biasing said latch for automatically moving into latching position in response to swinging movement of said platform relative to said carriage away from its stowed position to a position wherein the generally parallelogram arrangement of said carriage is established.

18. In a stowable lift apparatus, in combination: a mount; a lift platform; a lift carriage comprising respective lift and control arms having at their one ends a first pair of spaced pivots by which they are fulcrumed on said mount, and having at their other ends a second pair of spaced pivots by which they are pivoted to a margin of said platform to provide a linkage adapted to assume a generally parallelogram arrangement for elevating said platform while supporting it in a generally level attitude in which said pivots of each pair are in substantially vertically spaced relation; said control arm comprising sections articulated for effective length adjustment; means for connecting said sections at a fixed effective length such as to provide said parallelogram linkage, said connecting means being releasable to permit change of the effective length of said control arm permitting relative orbital movement of said second pair of pivots in which the lower pivot moves inwardly of the upper pivot toward said linkage and which orbital movement is such as to dispose said arms in crossed relation while permitting said platform to swing downwardly by gravity toward a depending stowed position; and power actuator means operative between said mount and said lift arm for elevating said carriage and thereby elevating said platform.

19. In a stowable lift apparatus, in combination: a mount, a lift platform, a lift carriage comprising respective lift and control arms having at their one ends a first pair of spaced pivots by which they are fulcrumed on said mount, and having at their other ends a second pair of spaced pivots by which they are pivoted to a margin of said platform to provide a linkage adapted to assume a generally parallelogram arrangement for elevating said platform while supporting it in a generally level attitude; said control arm comprising sections articulated for effective length adjustment; means for connecting said sections at a fixed effective length such as to provide said parallelogram linkage, said connecting means being releasable to permit change of the effective length of said control arm permitting relative orbital movement of said second pair of pivots such as to dispose said arms in crossed relation while permiting said platform to swing downwardly by gravity toward a depending stowed position; power actuator means operative between said mount and said lift arm for elevating said carriage and thereby elevating said platform; a control cam having upper and lower cam surfaces, said cam being mounted on said bed for rotatable adjustment on a horizontal axis for shifting said cam surfaces selectively into operative positions; cam follower means on said platform engageable with said lower cam surface when said cam is raised, for raising said platform to an elevated, extended position, and engageable with said upper cam surface when said cam is lowered, for swinging said platform forwardly from a free-hanging depending position to a forwardly and downwardly inclined stowed position beneath said carriage; and means for shifting said cam between said raised and lowered positions.

20. In a stowable lift apparatus, in combination: a bed; a mount carried thereby; a lift platform; a lift carriage comprising respective lift and control arms having at their one ends a first pair of spaced pivots by which they are fulcrumed on said mount, and having at their other ends a second pair of spaced pivots by which they are pivoted to a margin of said platform to provide a linkage having a generally parallelogram arrangement; means rendering said carriage operable for elevating said platform while supporting it in a generally level attitude, said means being releasable to permit said platform to swing downwardly toward a depending stowed position; power actuator means operative between said mount and said lift arm for elevating said carriage and thereby elevating said platform; a control cam having upper and lower cam surfaces, said cam being mounted on said bed for rotatable adjustment on a horizontal axis for shifting said cam surfaces selectively into operative positions; cam follower means on said platform engageable with said lower cam surface when said cam is raised, for shifting said platform from a depending position to a leveled, extended position in response to elevation of said carriage, and engageable with said upper cam surface when said cam is lowered, for swinging said platform forwardly from a free-hanging depending position to a forwardly and downwardly inclined stowed position in response to elevation of said carriage; and means for shifting said cam between said raised and lowered positions.

21. Lift apparatus as defined in claim 20, wherein said power actuator means comprises an hydraulic actuator, a pump for delivering fluid thereto to elevate said carriage, a motor for driving said pump, a control for energizing said motor, and a bleed valve for bleeding fluid from said actuator to permit said carriage to lower, and means linking said cam shaft means to said motor control and to said bleed valve for actuating said control to energize said motor when said cam shifting means is moved in one direction, and for actuating said valve to bleed said actuator when said cam shifting means is moved in an opposite direction.

22. Lift apparatus as defined in claim 21, including a lost-motion connection between said cam shifting means and said cam such that said motor control can be operated to energize said motor in an initial stage of movement of said shifting means, said movement including a final stage in which said cam is shifted to said raised position.

References Cited by the Examiner
UNITED STATES PATENTS

| | | | |
|---|---|---|---|
| 2,473,632 | 6/1949 | Bode | 248—408 |
| 3,138,270 | 6/1964 | McCarty | 214—77 |
| 3,172,549 | 3/1965 | Novotney | 214—77 |

GERALD M. FORLENZA, *Primary Examiner.*

R. G. SHERIDAN, *Assistant Examiner.*